US006807356B2

United States Patent
Heffner et al.

(10) Patent No.: US 6,807,356 B2
(45) Date of Patent: Oct. 19, 2004

(54) FIBER-COUPLED OPTICAL ATTENUATOR

(75) Inventors: Brian Lee Heffner, Los Altos, CA (US); Long Yang, Union City, CA (US)

(73) Assignee: JDS Uniphase Corporation, San Jose, CA (US)

( * ) Notice: Subject to any disclaimer, the term of this patent is extended or adjusted under 35 U.S.C. 154(b) by 309 days.

(21) Appl. No.: 10/013,258

(22) Filed: Dec. 10, 2001

(65) Prior Publication Data

US 2003/0108324 A1 Jun. 12, 2003

(51) Int. Cl.[7] ................................................ G02B 6/00
(52) U.S. Cl. ........................................ 385/140; 385/18
(58) Field of Search ................................ 385/140, 129, 385/132, 15, 16, 17, 18, 36

(56) References Cited

U.S. PATENT DOCUMENTS

| | | | |
|---|---|---|---|
| 4,919,503 A | 4/1990 | Mroynski | 350/96.2 |
| 6,021,247 A | 2/2000 | Helble | 385/149 |
| 6,137,103 A | 10/2000 | Giles et al. | 250/216 |
| 6,173,105 B1 * | 1/2001 | Aksyuk et al. | 385/140 |
| 6,195,478 B1 * | 2/2001 | Fouquet | 385/17 |
| 6,275,320 B1 | 8/2001 | Dhuler et al. | 359/237 |
| 6,351,580 B1 * | 2/2002 | Dhuler et al. | 385/19 |
| 6,385,364 B1 * | 5/2002 | Abushagur | 385/16 |
| 6,389,189 B1 * | 5/2002 | Edwards et al. | 385/18 |
| 6,404,942 B1 * | 6/2002 | Edwards et al. | 385/18 |
| 6,504,968 B1 * | 1/2003 | Zhu et al. | 385/18 |
| 6,583,031 B2 * | 6/2003 | Lin | 438/459 |

OTHER PUBLICATIONS

Silicon Micromachines in Lightwave Networks, Tug Room 1A, Tuesday, Feb. 23, 1999, David J. Bishop, Bell Laboratories, Lucent Technologies, OFC/100C 99 Tutorials, pp. 3–30.

* cited by examiner

Primary Examiner—Frank G. Font
Assistant Examiner—Kevin C Kianni
(74) Attorney, Agent, or Firm—Allen, Dyer, Doppelt, Milbrath & Gilchrist, P.A.

(57) ABSTRACT

An optical attenuator has a planar MEMS substrate supporting two optical fibers; an actuator; and a silicon vane actuatable by said actuator for a movement into and out of the optical beam passed between the fibers. The vane is configured to divert at least a portion of the optical beam off the optical axis when the element is moved into the optical beam. The vane has at least one surface disposed non-perpendicularly relative to the optical axis of the beam. The vane may be of a wedged shape.

8 Claims, 2 Drawing Sheets

FIBER-COUPLED OPTICAL ATTENUATOR

RELATED APPLICATIONS

Not applicable.

TECHNICAL FIELD

This invention relates to optical attenuators, and particularly to variably controlled, fiber-coupled, microelectromechanically actuated optical attenuators.

BACKGROUND OF THE INVENTION

Many types of optical attenuators have been developed since the onset of optical telecommunication. As commonly known, optical attenuators are related to optical switches wherein the attenuators afford a stepwise or entirely variable control of the intensity reduction of the incident optical beam.

Fiber-coupled optical attenuators can be made by aligning and spacing two angle-cleaved optical fibers so that the two fibers define a substantially common optical axis, with the spacing being only as large, with the view to limiting the diffraction loss, as to insert a blocking vane into the gap between the two "butt-coupled" fibers. As exemplified e.g. by U.S. Pat. No. 6,222,656 or U.S. Pat. No. 6,275,320, the vane may be opaque and may function by blocking partially or entirely the incident beam.

Also known are optical attenuators with a rotary variable-transmissivity attenuating element. Attenuation is effected by positioning the element in the path of the incident light beam such that predetermined portions of the element of different transmissivity face the incident beam.

Advances in semiconductor and thin film technology have enabled the development of micro-electro-mechanical system (MEMS) structures. MEMS structures, available in size on the order from a few hundred microns to a few millimeters, are typically capable of motion or applying force. They are also used in a variety of optical applications that include light switches and attenuators. The latter case is exemplified by a recent U.S. Pat. No. 6,275,320 to Dhuler (MEMS Variable Optical Attenuator).

In a MEMS environment, the application of rotary vanes is not very practical and linearly-movable vanes are the typical choice. In this context, it has been found that the use of an absorbing or reflecting vane can result in a large PDL (polarization dependent loss) at attenuations above 5 dB. For example, in an attenuator with a gold-coated vane, adjusted for an attenuation of 20 dB, the PDL is likely to exceed 1 dB. An attenuator described in the Tutorial "Silicon Micromachines in Lightwave Networks," by David Bishop, Optical Fiber Communication Conference (OFC '99), Feb. 21–26, 1999, is an example of such design. This loss arises because absorbing and reflecting materials exhibit conduction currents in response to incident light, and the shape of the vane allows higher current in the direction parallel to the edge of the vane than in the direction perpendicular to the vane.

SUMMARY OF THE INVENTION

It is an object of the invention to eliminate or reduce at least some of the problems associated with the above-discussed prior art, and to provide a small-size fiber-coupled optical attenuator offering at least a reduced PDL compared to analogous prior art devices.

In one aspect, the present invention provides an optical attenuator for optically attenuating an optical beam passing from one optical fiber end to another optical fiber end along an optical axis, the fiber ends spaced from each other by a gap, the attenuator comprising a substrate supporting the optical fiber ends, an actuator, and a transparent or translucent light-diverting element associated with and actuatable by said actuator for movement into and out of the optical beam, the element configured for diverting at least a part of the optical beam off the optical axis when moved into the path of the optical beam.

The element may have at least one surface disposed at a non-perpendicular angle relative to the optical axis for diffracting at least a part of the beam off its axis.

The angle of diffraction may be an acute angle, whereby at least part of the optical power of the beam is shifted, refracted or diverted but not reflected.

Preferably, the attenuator is embodied in a MEMS structure, i.e. the fiber ends, the actuator and the optical light-diverting element (called also "vane"), are provided on a microelectronic generally planar substrate.

It is preferable that the vane be of dielectric material e.g. of silicon because of lower induced currents at the boundaries. A dielectric with moderate index of refraction is best because a very high refractive index would result in higher induced currents, and likely in higher PDL.

The refractive index of silicon is about 3.4 at 1550 nm, which is higher than desired (silicon is essentially transparent at wavelengths longer than about 1400 nm). The anti-reflection coating, in addition to suppressing back-reflections, also creates a lower index in the boundary region, reducing the induced currents and the PDL.

The vane should be at least somewhat transparent rather than strongly absorbing, because an absorbing material would melt or burn when operating at high optical power. Even if the vane attains a high temperature below the melting point, the heat could affect the thermal actuator or radiate blackbody radiation into the fibers.

BRIEF DESCRIPTION OF THE DRAWINGS

Further features and advantages of the present invention will become apparent from the following detailed description taken in conjunction with the appended drawings in which.

It will be noted that throughout the appended drawings, like features are identified by like reference numerals.

DETAILED DESCRIPTION OF THE PREFERRED EMBODIMENT

Figure 1:
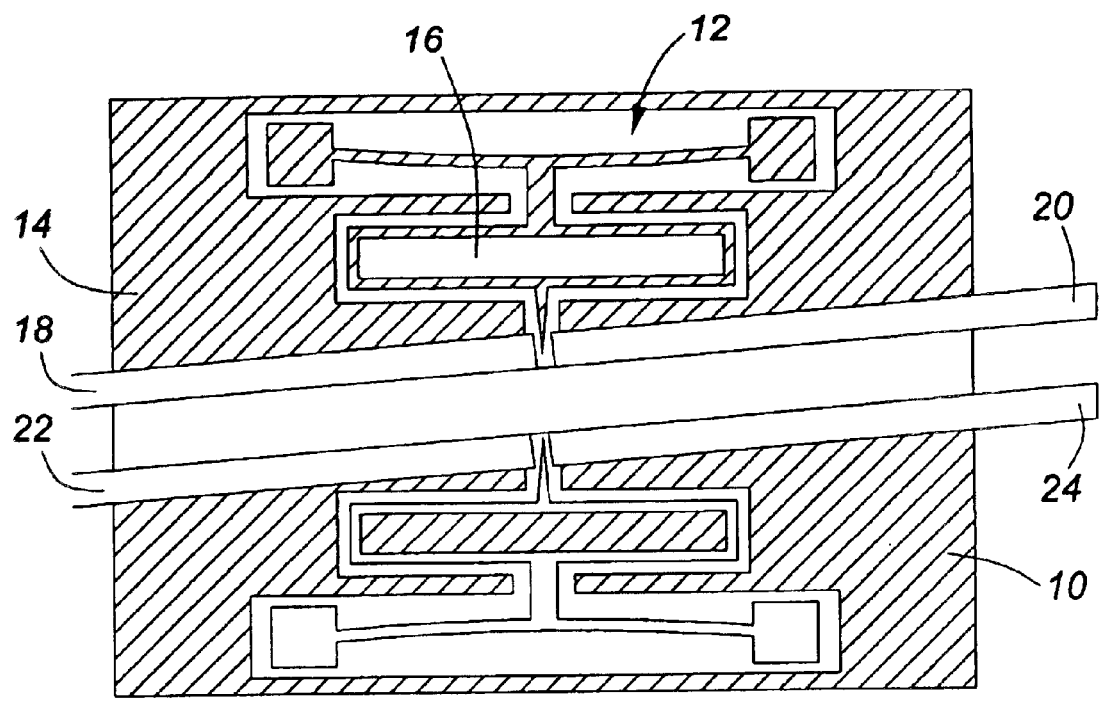
FIG. 1 is a schematic plan view of a MEMS chip with two attenuators according to an embodiment of the invention.

Referring now to FIG. 1, a first embodiment of a variable optical attenuator is shown in a plan view in a MEMS version. The structure has a microelectronic substantially planar substrate 10, a thermal arched beam (TAB) actuator 12 and an optical vane 14 connected to the actuator via a thermal shield 16. The vane is made of a transparent or partly transparent material, e.g. silicon, quartz, glass etc. Two fiber pairs 18, 20, 22, 24 are mounted on the substrate such that their longitudinal axes define an optical axis of light beams carried therethrough and they define, respectively, two gaps between each pair (18, 20 and 22, 24)

of fibers. Of course, it is preferable to keep the gap to a minimum to minimize coupling loss, and of sufficient size to enable the movement of the vane in the gap. The details of the MEMS substrate and its manufacturing process are omitted as well known in the art (e.g. from the U.S. Pat. No. 6,275,320 to Dhuler et al, mentioned above). The substrate may be formed of silicon, glass, quartz or a polymeric material. The thermal shield is also a feature known in the art. Advantageously, the design as shown in FIG. 1 is substantially planar.

Figure 2:
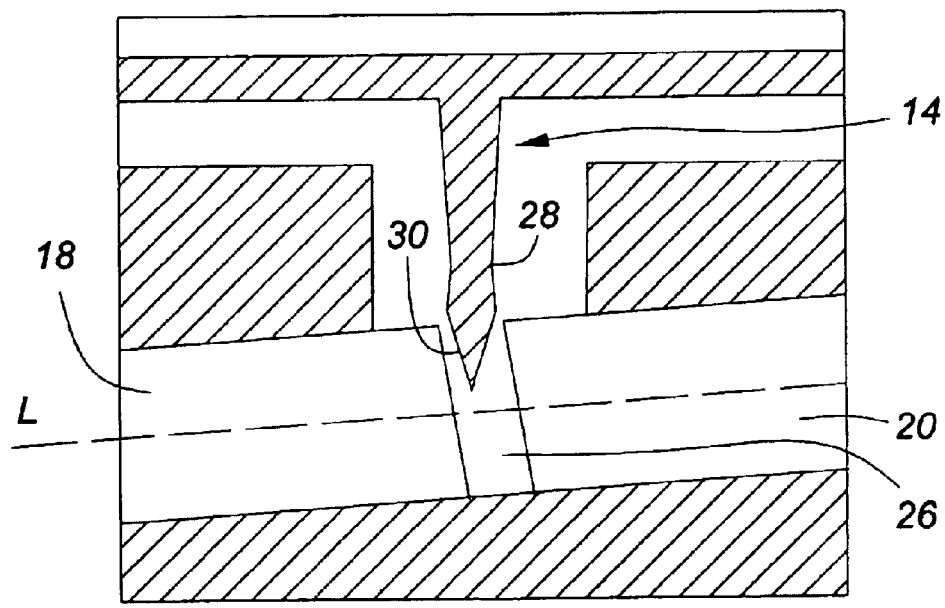
FIG. 2 is an enlarged view of a vane of the attenuator.

As shown in FIG. 2, the end faces of the fibers 18, 20, 22, 24 are polished or cleaved at an angle of a few degrees to minimize backreflection, as known in the art. The gaps 26 are dimensioned to accommodate the vane 14 and its movement across the gap when the actuator 12 is activated. In the actual embodiment, the gap is about 20 micrometers and the vane is about 10 micrometers across in the non-tapered "neck" portion 28. The vane has a tapered wedge portion 30, with the angle of the taper for example in the range 12–25°, such that when the TAB actuator 12 is actuated, the vane moves into the path of a light beam transmitted by the cores of the fibers 18–24. It is important that the vane extend, when actuated, over at least a part of the cores of the facing fiber pairs.

It can be seen in FIG. 2 that at least one wall of the tapered part of the vane 14 is disposed at an angle to the optical axis L of the fibers 18, 20 that is different from normal. This has the consequence of at least a part of the light beam incident on the transparent vane material from, say, the (input) fiber 18, to undergo a refraction and exit the vane at an angle to the initial direction in the fiber 18. The shape of the vane (wedged in this embodiment) is selected such that the deviation of the refracted part of the beam is large enough so that the refracted light is essentially not coupled into the core of fiber 20 but is instead coupled into cladding modes of the (output) fiber 20 and absorbed within a short distance.

It will be noted that the transparency and moderate index of refraction of the vane reduces the occurrence of conduction current caused by the prior art reflective or absorptive vanes as discussed above. Due to small dimensions of the vane (of the order of a hundred micrometers), it may not be easy to produce a perfectly smooth surface of the vane. This may cause some optical power being reflected back into the fiber 18, despite the slant of the end faces. In order to reduce this backreflection, an anti-reflective coating, known in the art, may be deposited on one or both faces of the vane. The anti-reflective coating also creates a lower effective index in the boundary between the vane and the surrounding air, reducing the induced currents and the PDL.

Figure 3:
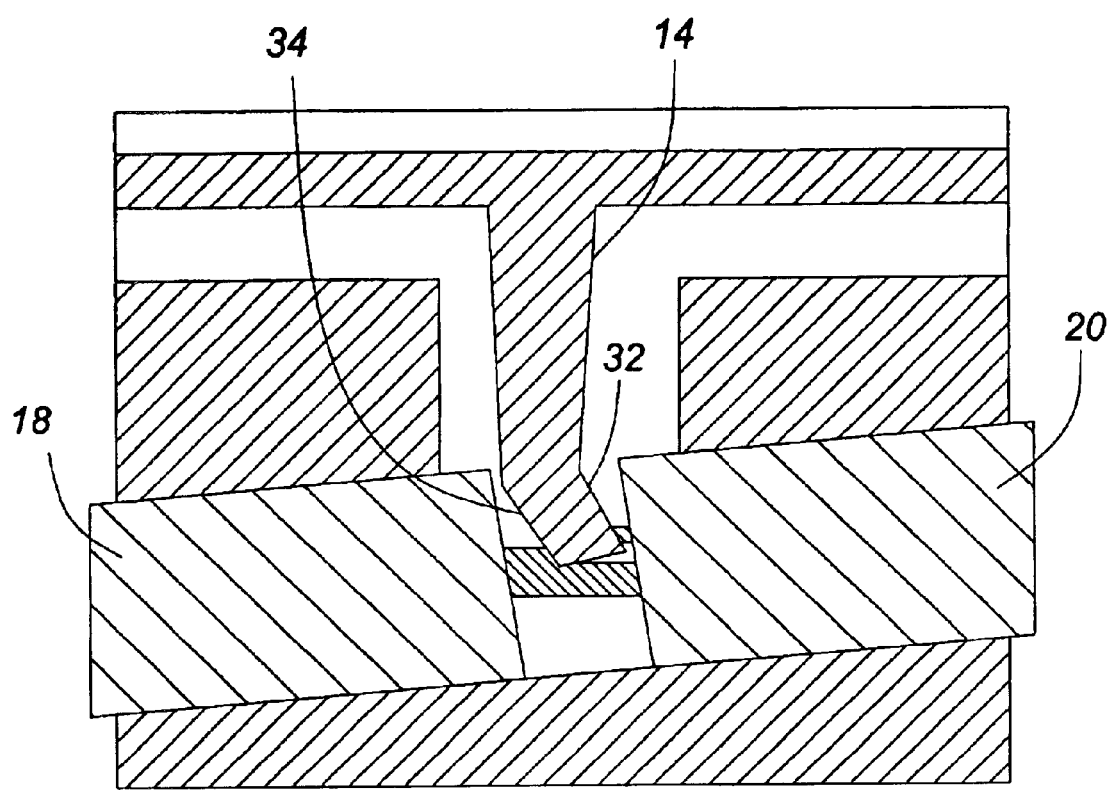
FIG. 3 is a schematic enlarged plan view of another vane design.

In another embodiment, shown in FIG. 3, the vane has two parallel faces 32, 34, one of them facing the input fiber 18 and the incident beam and the other facing the output fiber 20. As seen, the vane is mounted such that both faces 32 and 34 are disposed non-perpendicularly to the optical axes of the fibers 18, 20. As a result, at least part of the incident beam undergoes refraction in the transparent material of the vane and becomes diverted from the optical axis to a significant degree, thereby causing attenuation of the incident beam as the refracted part of the beam is shifted outside of the core of the output fiber.

It is an advantage of the invention that the attenuator may be devoid of focusing and collimating lenses as the gap (about 20 micrometers for single-mode fibers) is designed to minimize undesired optical power loss between the fibers through diffraction. Also, the invention has been found to significantly reduce the PDL due to the transparency and moderate index of refraction of the vane element.

The embodiment(s) of the invention described above is(are) intended to be exemplary only. The scope of the invention is therefore intended to be limited solely by the scope of the appended claims.

We claim:

1. A variable optical attenuator for optically attenuating an optical beam passing from one optical fiber end to another optical fiber end along an optical axis, the fiber ends spaced from each other by a gap, the gap being less than a diameter of one of the optical fibers, the attenuator comprising a substrate supporting the optical fiber ends, an actuator, and a transparent or translucent light-diverting element associated with and actuatable by said actuator for a movement into and out of the optical beam in the gap, wherein the element is configured to divert at least a portion of the optical beam off the optical axis when the element is moved into the optical beam.

2. The optical attenuator of claim 1 wherein the element has at least one surface disposed non-perpendicularly relative to the optical axis whereby the at least a part of the optical beam undergoes refraction in the element, and whereby at least a portion of the attenuated beam is diverted to the cladding of said another fiber.

3. The optical attenuator of claim 1 wherein the optical element is of wedged shape.

4. The optical attenuator of claim 1 wherein the optical element has two parallel surfaces disposed at a non-perpendicular angle to the optical axis.

5. The optical attenuator of claim 1 wherein the substrate is a substantially planar MEMS substrate.

6. The optical attenuator of claim 1 wherein the optical element is of silicon.

7. The optical attenuator of claim 1 wherein the optical element has an antireflective coating.

8. An optical attenuator for optically attenuating an optical beam passing from one optical fiber end to another optical fiber end along an optical axis, the fiber ends spaced from each other by a gap, the attenuator comprising a substrate supporting the optical fiber ends, an actuator, and a transparent or translucent light-diverting element associated with and actuatable by said actuator for a movement into and out of the optical beam in the gap, wherein the element is configured to divert at least a portion of the optical beam off the optical axis when the element is moved into the optical beam, wherein the actuator is a thermal arched beam actuator.

* * * * *

UNITED STATES PATENT AND TRADEMARK OFFICE
CERTIFICATE OF CORRECTION

PATENT NO. : 6,807,356 B2
DATED : October 19, 2004
INVENTOR(S) : Heffner et al.

It is certified that error appears in the above-identified patent and that said Letters Patent is hereby corrected as shown below:

Column 2,
Line 36, "bum" should read -- burn --.

Column 4,
Line 42, claim 6 should read:
-- An optical attenuator for optically attenuating an optical beam passing from one optical fiber end to another optical fiber end along an optical axis, the fiber ends spaced from each other by a gap, the attenuator comprising
a substrate supporting the optical fiber ends,
an actuator, and
a transparent or translucent light-diverting element associated with and actuatable by said actuator for a movement into and out of the optical beam in the gap, wherein the element is configured to divert at least a portion of the optical beam off the optical axis when the element is moved into the optical beam, wherein the actuator is a thermal arched beam actuator. --.
Line 44, claim 7 should read:
-- The optical attenuator of claim 1 wherein the optical element is of silicon. --.
Line 46, claim 8 should read:
-- The optical attenuator of claim 1 wherein the optical element has an antireflective coating. --.

Signed and Sealed this

Twenty-seventh Day of September, 2005

JON W. DUDAS
*Director of the United States Patent and Trademark Office*